(12) United States Patent
Haronian et al.

(10) Patent No.: US 11,916,462 B2
(45) Date of Patent: Feb. 27, 2024

(54) ELECTROMAGNETIC KINETIC ENERGY HARVESTER

(71) Applicant: Enervibe Ltd., Airport City (IL)

(72) Inventors: Michael Haronian, Tzur Hadasa (IL); Danny Stanislav Korotaev, Tzufin (IL)

(*) Notice: Subject to any disclaimer, the term of this patent is extended or adjusted under 35 U.S.C. 154(b) by 194 days.

(21) Appl. No.: 17/584,440

(22) Filed: Jan. 26, 2022

(65) Prior Publication Data
US 2023/0238870 A1    Jul. 27, 2023

(51) Int. Cl.
*H02K 53/00* (2006.01)

(52) U.S. Cl.
CPC .................... *H02K 53/00* (2013.01)

(58) Field of Classification Search
CPC .......... H02K 7/1892; H02K 1/34; H02K 7/06; H02K 35/02; H02K 53/00; H02K 7/1853
See application file for complete search history.

(56) References Cited

U.S. PATENT DOCUMENTS

| 4,367,449 A * | 1/1983 | Veisz | H01F 7/08 335/229 |
| 8,604,649 B1 * | 12/2013 | Bartol, Jr. | H02K 35/02 310/68 B |
| 11,114,926 B2 * | 9/2021 | Delette | H02K 35/02 |

OTHER PUBLICATIONS

Applied Physics Letters, American Institute of Physics, 2 Huntington Quadrangle, Melville, NY 11747, vol. 109, No. 13, Sep. 26, 2016 (Sep. 26, 2016), XP012212319, ISSN: 0003-6951, DOI: 10.1063/1.4963786.

* cited by examiner

*Primary Examiner* — Leda T Pham

(57) ABSTRACT

A harvesting system that includes a dynamo with a rotor and a stator, a push magnet that is attached to the rotor or is a part of it, a moving magnet that moves from a first position to a second position, and a push back magnet. The repulsive magnetic force that is exerted by the moving magnet on the push magnet in the second position is greater than that force in the first position. The moving magnet moves from the first position to the second position and causes the rotor to rotate from a dynamo first position to a dynamo second position that causes the dynamo to produce current. When the moving magnet moves back to the first position the dynamo returns to its first position due to magnetic force that the push back magnet exerts on the push magnet.

2 Claims, 10 Drawing Sheets

ELECTROMAGNETIC KINETIC ENERGY HARVESTER

TECHNICAL FIELD

The present disclosure is related to an electromagnetic kinetic energy harvester that uses a movement into rotations converter.

BACKGROUND AND PRIOR ART

Most object movements are not circular. Typically, movement are in one direction or in different directions. On the other hand, electromagnetic devices such as motors and dynamos use rotation to either generate movement or to generate electricity. Therefore, a simple means for converting a movement into rotation may harvest movements of objects by converting them into rotations of an electromagnetic device such as a dynamo. This patent application relates to an electromagnetic kinetic energy harvester that converts movements into rotations of an electromagnetic device that may be a simple magnet and a coil or a more complex device such as a dynamo. Rotation of a coil relative to a magnet or to a set of magnets is a well-known technology in motors where electricity is converted to rotation, and in dynamo where rotation is converted into electricity. The advantage of the electromagnetic energy harvester described in this invention is by translating movements into rotation using specially designed magnetic field and by utilizing the technology of dynamo to generate electricity.

Movements may be caused by vibrations, a mechanical impacts, or a short press. Vibration may be for example induced by a vibration of a machine with specific or random vibration frequency. Mechanical impacts for example may be induced by human or animal stepping, or sudden bending of a tire when it is pressed against the road. Impact force is also applied on balls and rackets during play. Short press for example may be a switch such that the press generates electricity that is used to wirelessly switch remote devices on or off.

State of the art magnetic kinetic energy harvester uses a magnet suspended over a spring close to a coil and harvest the electricity developing in the coil when the magnet vibrates or suddenly move relative to the coil. The electricity generated in the coil is then harvested using an appropriate power management circuit. In such harvesters the spring serves as a restoring force: In case of vibration the magnet oscillates back and forth relative to the coil, and in case of an impulse the spring returns the magnet to its initial state where it is ready for the next excitation. This patent application doesn't use a spring and the restoring force results from specific configuration of fixed magnets that restore the system back to its initial state.

FIG. 1 describes state of the art an Electromagnetic Vibration Energy Harvesting showing a magnet (100) suspended by a spring (101) inside a coil (102). The coil is fixed to a body (103) such that when the body moves or vibrates the magnet vibrates or moves relative to the coil and induces voltage between the two ends of the coil (1021).

Prior art U.S. Pat. No. 8,704,625B2 is described schematically in FIG. 2, is another configuration of an electromagnetic harvester. In this configuration a magnetic circuit is formed using two permanent magnets (200) and (210) and a ferromagnetic beam (220). The ferromagnetic beam (220) is wrapped by a coil (230) and is free to rotate around hinge (2203) that is fixed to the base (240). In a first position, shown in FIG. 2a, the N pole of magnet (200) touches or is at close proximity to the $1^{st}$ side (2201) of beam (220) and the S pole of magnet (210) touches or is at close proximity to the $2^{nd}$ side (2202) of beam (220). In this state the magnetic flux flows through the beam from the $1^{st}$ side to the $2^{nd}$ side. A force F is applied on beam (220), as described in FIG. 2b, against spring (230) that is fixed from one side to beam (220) and from the other side to the base (230). The force F rotates the beam around hinge (2203) such that the $1^{st}$ side (2201) touches or is at close proximity to the S side of magnet (210) and the $2^{nd}$ side (2202) touches or is at close proximity to the N side of magnet (210). When the direction of the magnetic flux along beam (220) is reversed an electric pulse is generated in the coil. When the force F is removed, spring (230) restores beam (220) to its first state and by that generating another electrical pulse in the coil. The electrical pulses generated in the coil may be harvested using an appropriated power management circuit.

Prior art CN 110649763 B, described in FIG. 3, is a kinetic harvester that converts vibration or a linear reciprocating motion to rotation. Vibration or linear motion applied to the top cover (300), moves the top cover downwards. The thread rope (301) is converted from a tight state to a loose state, and at the moment, under the interaction of magnetic force between the magnet (302) and the ferromagnetic patch (303), the rotor (304) rotates for a certain angle relative to the top cover (300). When the external excitation is reversed, the wire rope (301) is restored to a tight state under the action of the restoring force of the spring (305) and drives the rotor (304) to rotate reversely; the external excitation periodically acts on the top cover (300), and the rotor (304) periodically rotates clockwise and anticlockwise alternately; in the rotation process of the rotor (304), relative motion is generated between a magnet (302) fixed in the rotor (304) and a coil (306) fixed on the base (307), so that electric energy is continuously output through the coil (306) based on the electromagnetic induction principle.

The harvester described in FIG. 1 and FIG. 2 use a spring as a restoring force. The harvester described in FIG. 3 converts vibration or linear motion into rotation but still uses a spring as a restoring force.

SUMMARY

This patent application relates to electromagnetic kinetic energy harvester that is based on converting vibration or a linear motion into rotation of an electromagnetic device that comprises at least one magnet and a coil. The electromagnetic device may be a simple magnet and a coil or a more complex device such as a dynamo. Rotation of a coil relative to a magnet or to a set of magnet is a well-known technology for converting electricity to rotation as used in electrical motor and to converting rotation into electricity as used in a dynamo. This patent application will demonstrate the inventiveness of this patent application using simple magnets and coil configuration. In some cases, a dynamo will be used as the part that generates electrical power. It is understood that any configuration of magnets and coils known may be used. The advantage of this invention is by translating a short movement into rotation without a spring and to utilizing any electromagnetic based technology to generate electricity.

In addition, other energy harvesting technologies, such as electrostatic or piezoelectric, that utilizes the conversion from vibration or linear motion as described in this patent application, may be used.

DETAILED DESCRIPTION

Figure 4A:
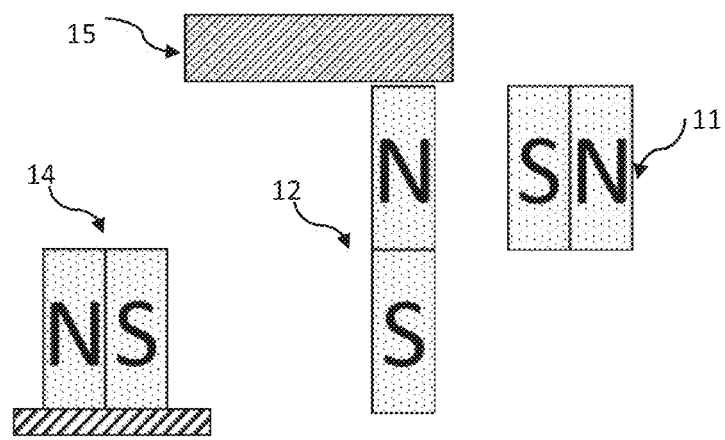
FIGS. 4(a) and 4(b) are General description of direction converter.
Figure 4B:
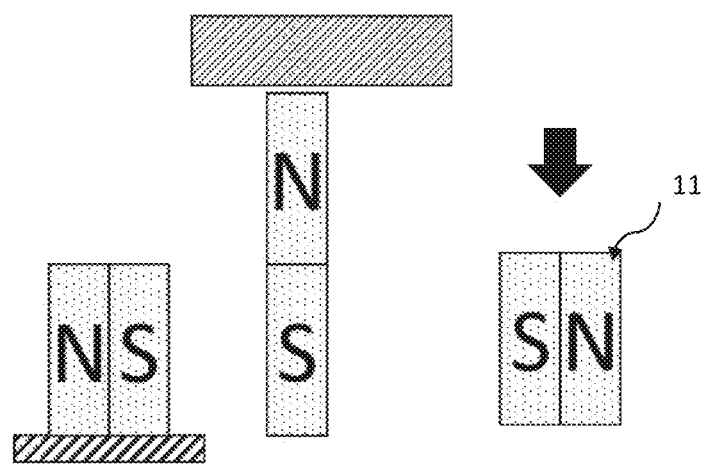

Reference is made to FIGS. 4(a) and 4(b) that describe a direction converter in which a movement in one direction is converted to a movement in another direction. In FIG. 4(a), magnet (11) is in first position. The magnet is designed to move in the vertical direction when force F is applied on it. In FIG. 4a magnet (11) is forced to face magnet (12) because of the attractive force between the S side of magnet (11) and the N side of magnet (12). FIG. 4b describe the state of the harvester when a force F is applied on magnet (11) and moves it downwards such that the S side of magnet (11) is facing the S side of magnet (12). In this position, magnet (11) applies a repulsive force on magnet (12) and moves it to the left towards magnet (14). The movement of magnet (12) when the repulsive forces applied on it by magnets (11) and (14) equals zero. When the force F is removed the repulsive force between magnet (14) and magnet (12) and the attracting force between magnet (12) and magnet (11) are designed such that magnet (11) returns to the first position. The movements of magnet (12) relative to coil (15) induces current in the coil that may be harvested using an appropriated electric circuit.

Figure 1:
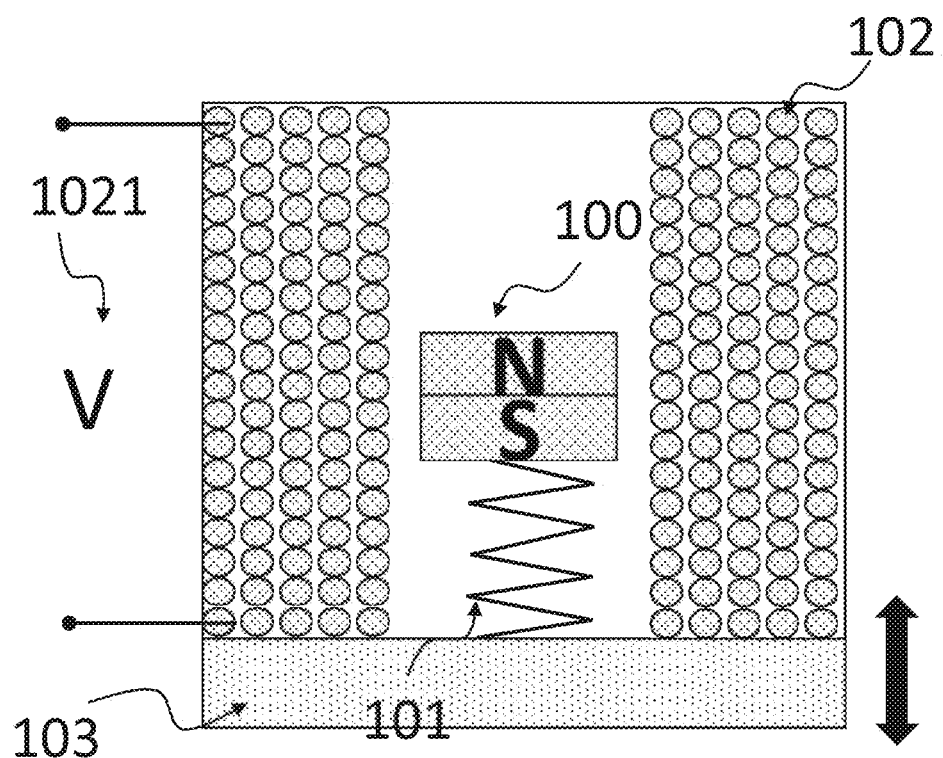
FIGS. 1, 2(a), 2(b) and 3 describe Prior art.
Figure 2A:
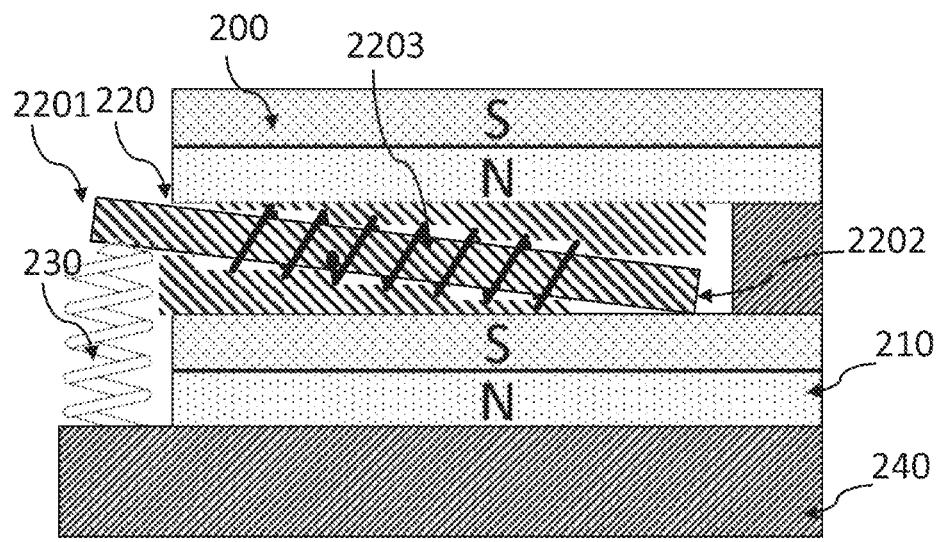
Figure 2B:
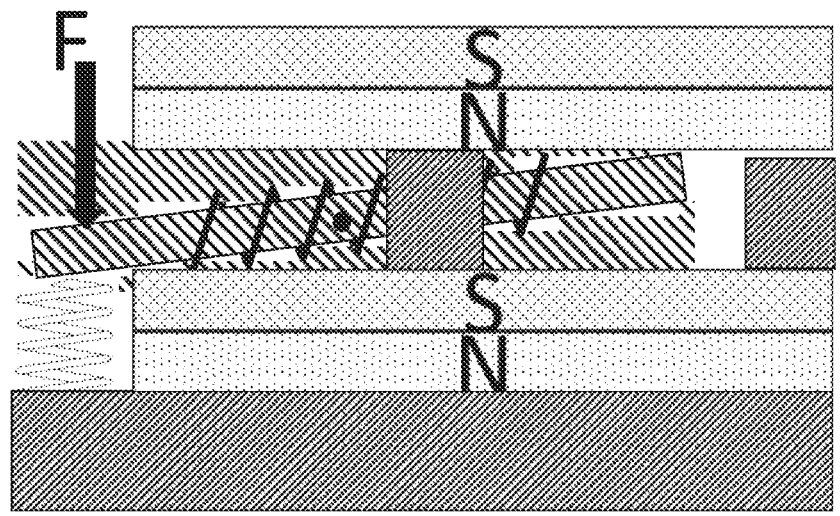
Figure 3:
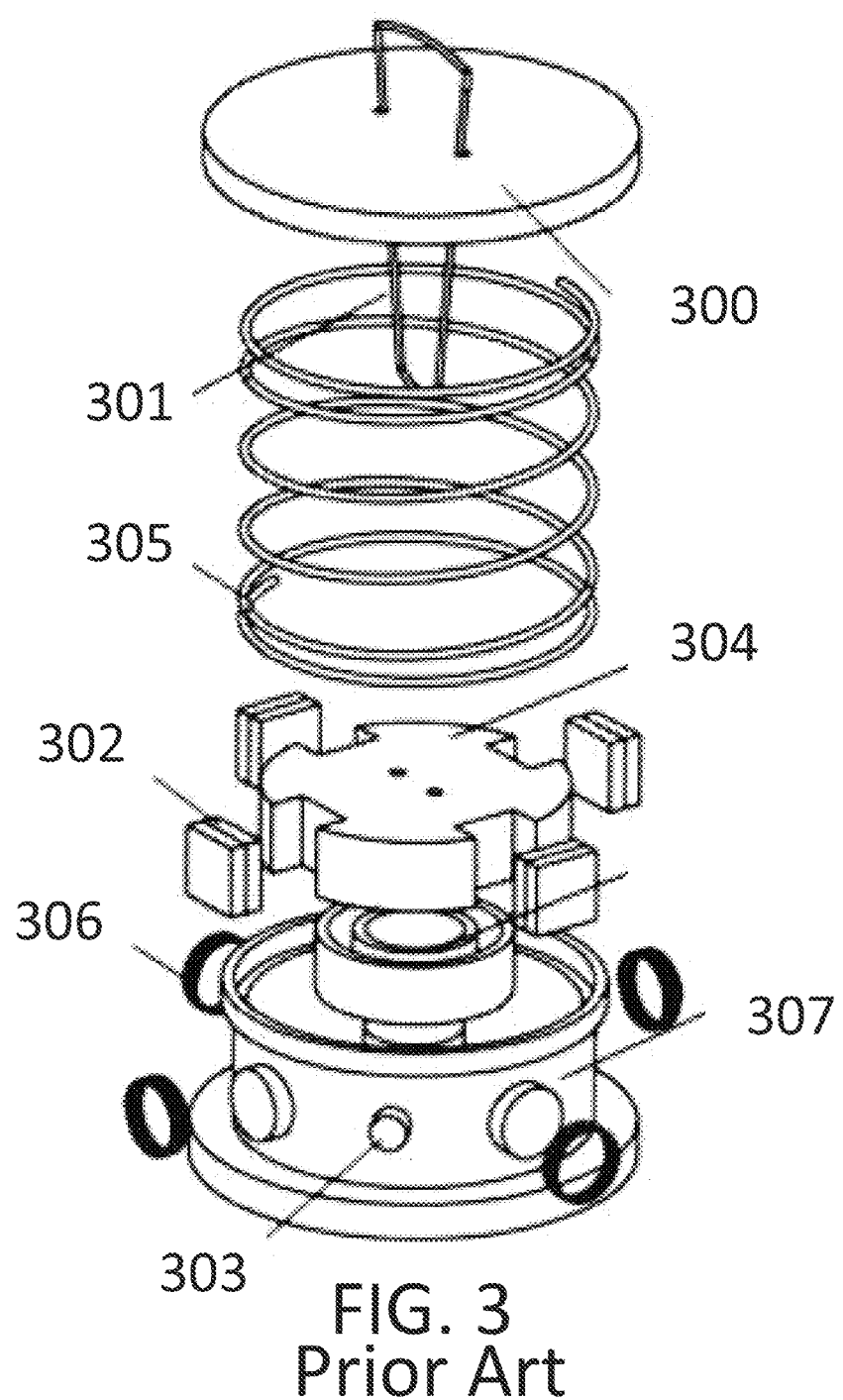

Reference is made to FIG. 5 that describes a kinetic harvester (1) that uses the direction converter described in FIG. 2. In this embodiment device (2) is a dynamo such that (21) is the rotor and (22) is the stator. Magnet (3) is fixed to the rotor (21) of dynamo (2). Magnet (4) is fixed to cap (6) that may move downwards when a force is applied.

Figure 5A:
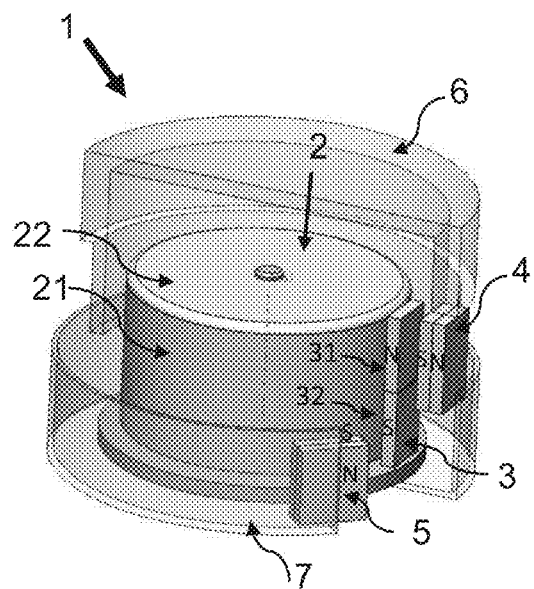
FIGS. 5(a)-5(d) depict and embodiment of the invention using direction converter.
Figure 5B:
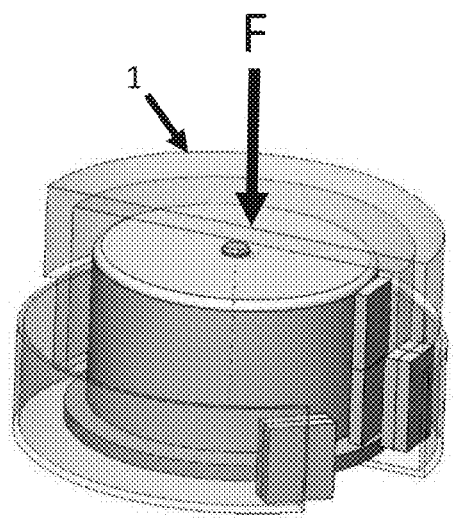
Figure 5C:
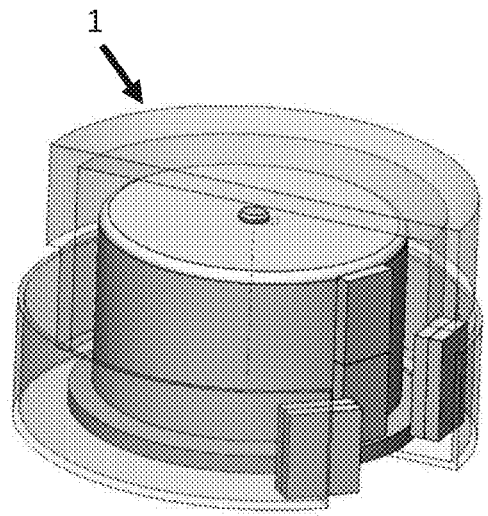
Figure 5D:
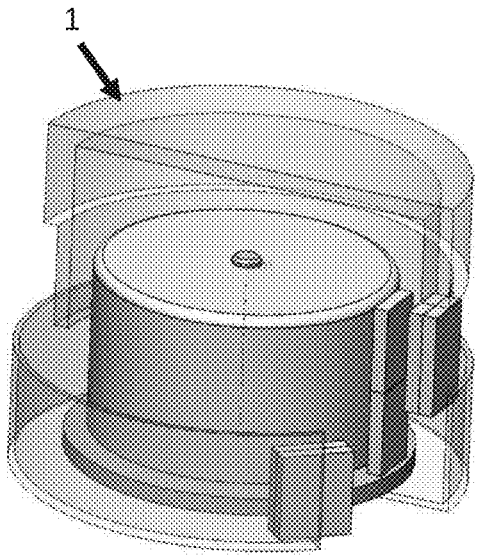

FIG. 5a describes the module in a first position. In this position the S side of a moving magnet (4) is facing the N side (upper pole (31)) of a push magnet (3) such that attractive force is formed between these two magnets. FIG. 5b describes the module in a second position when force F is applied on a cap (6) that displaces the moving magnet (4) downwards such that the S side of the moving magnet (4) is facing the S side of the push magnet 3. In this position magnet (4) applies a repulsive force on magnet (3) that rotates rotor (21) of dynamo (2) relative to the stator (22). The dynamo rotation is stopped by a counter force that the S side of a push bake magnet (5) applies on the S side (lower pole (32)) of the push magnet (3) as shown in FIG. 5c. When force F is removed, the repulsive force between magnet (5) and magnet (4) and the attractive force between the N side of magnet (4) and the S side of magnet (4) rotates the rotor back to its first state and moves cap (6) with magnet (4) back to the first state as described in FIG. 5d. The back and forth rotation of rotator (21) around stator (21) generates electricity in the dynamo that is harvested using an appropriated power management circuit.

Figure 6A:
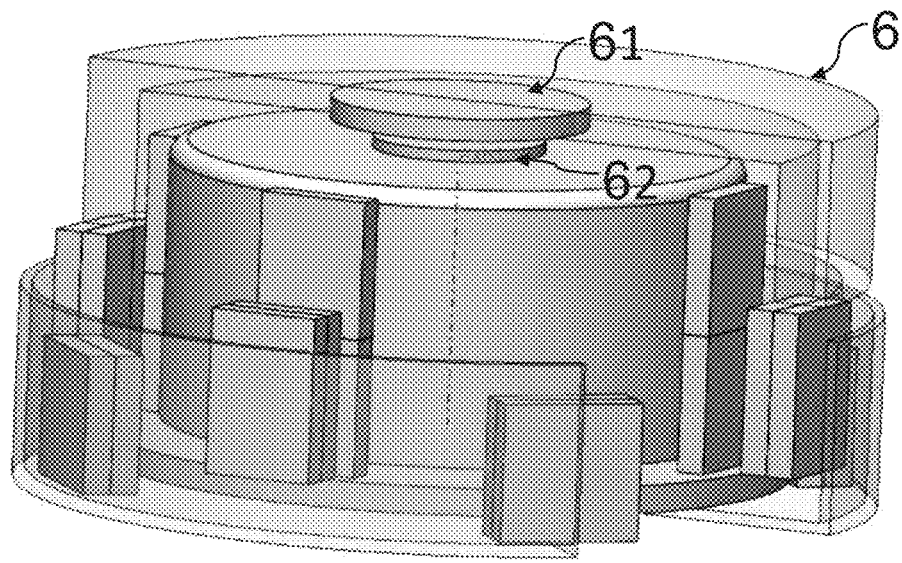
FIGS. 6(a)-6(b) depict an embodiment described in FIG. 5 with an addition of restoring magnet.
Figure 6B:
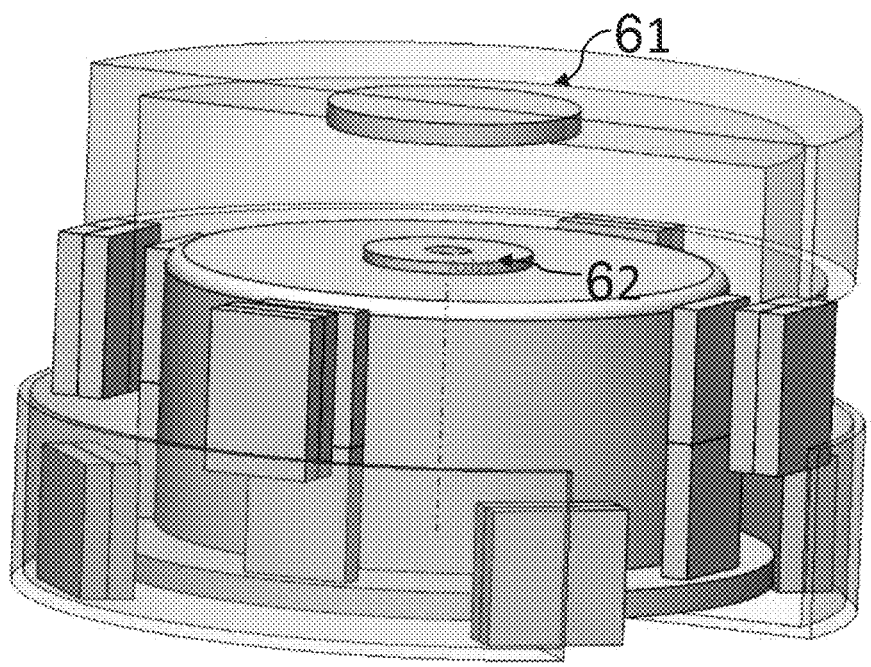

Reference is made to FIG. 6 that shows the embodiment described in FIG. 5 with an addition of two keeping away magnets (61) and (62) that are arranged such that repulsive force is generated between the two magnets. FIG. 6a describes the device when a force is applied on the cap and the cap is pressed and FIG. 6b describes the device when the force is removed and the cap returns to its first position, partly due to the repulsive force between magnet (61) and magnet (62). It is noted that a spring may be used as a restoring force.

Figure 7A:
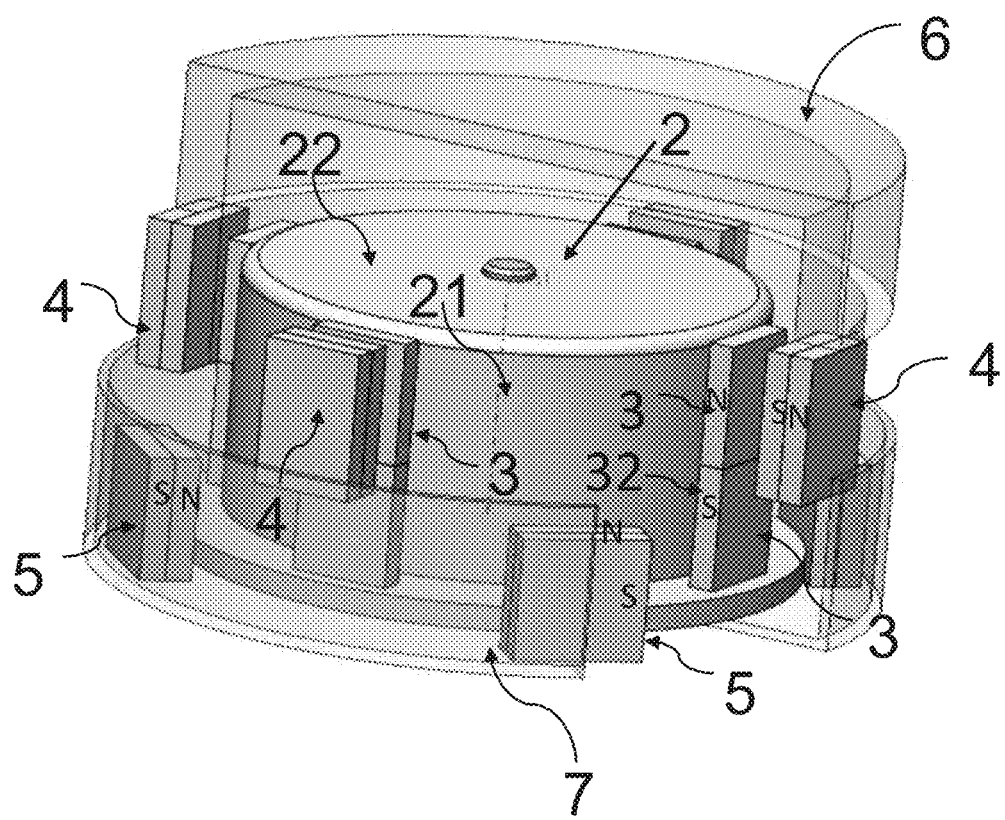
FIGS. 7(a)-7(f) depict a second embodiment of the invention.
Figure 7B:
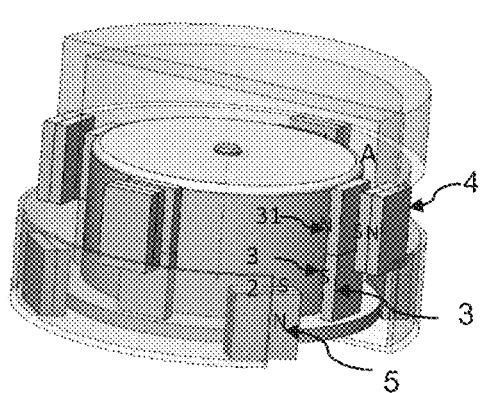
Figure 7C:
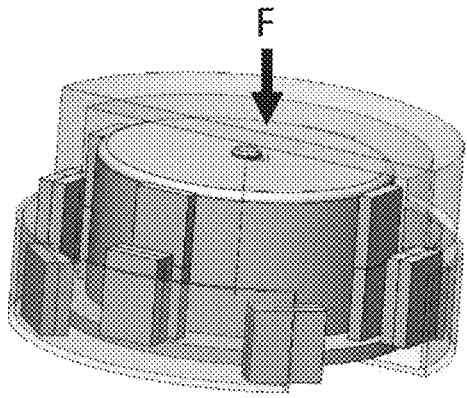
Figure 7D:
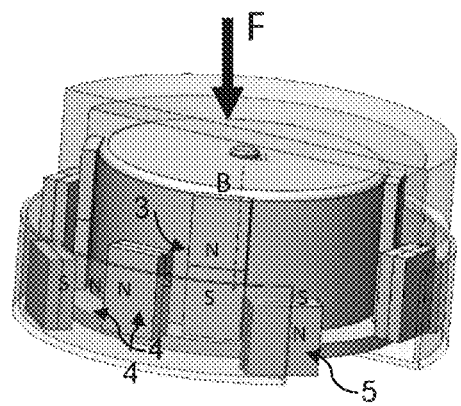
Figure 7E:
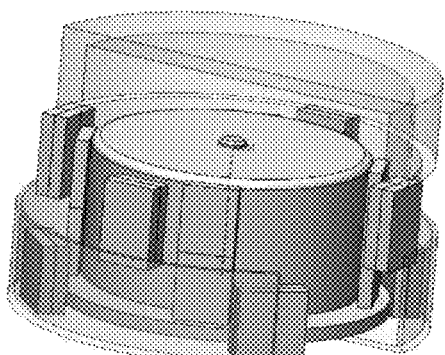
Figure 7F:
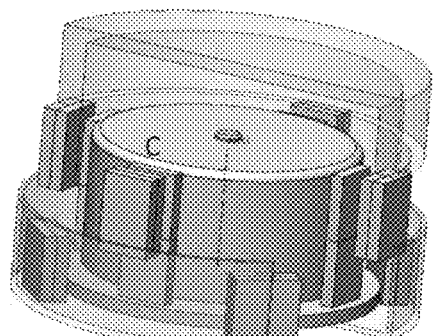

Reference is made to FIG. 7a describing another embodiment of this patent. This embodiment companies the same components as the embodiment descried in FIG. 5 except for that magnets (3), (4) and (5) are repeated every 90 degrees around dynamo (2). In FIG. 7b cap (6) with four of magnets (4) is in a first position. In FIG. 7b an impact force F is applied on the cap that pushes the cap and four magnets (4) down to the second position. A fast impact will generate a high force between magnets (4) and magnets (3) that will rotate rotor (21) such that magnets (3) is shifted to position B that is beyond magnets (5) as described in FIG. 7d. Once the impact is removed and the cap with magnets (4) is shifted to the first position, the rotor will rotate in the same direction to position C which is the same as position A but at 90 degrees rotation.

Figure 8A:
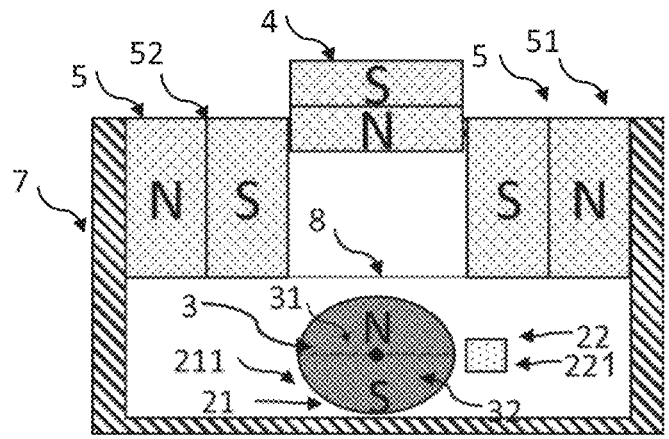
FIGS. 8(a)-8(c) depict a third embodiment of the invention.
Figure 8B:
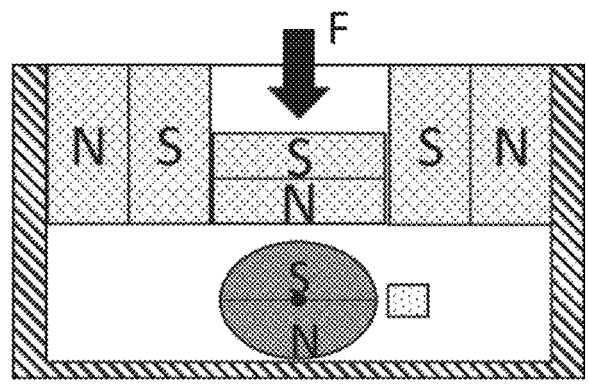
Figure 8C:
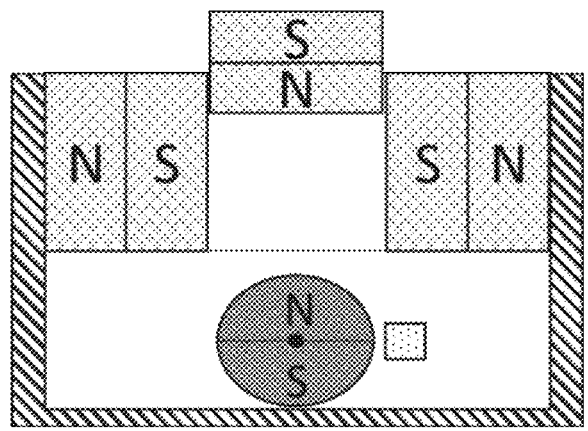

Reference is made to FIG. 8 that describes another embodiment of this invention. This embodiment comprises a moving magnets, (4), and pushback magnets (5) such that magnets (5) are fixed to the device body (7), and magnet (4) is designed to be positioned in its first position at the upper side of the magnets (5) and is designed to move in the vertical direction when a vertical force is applied. Magnet (3) is preferably a cylindrical magnet that is supported by a hinge (31) that is fixed to the body (7) and is free to rotate around it. In FIG. 8a Magnet (4) is at is first position.

When force F is applied on magnet (4), it is displaced downwards until it reached a stop (8) and rotates magnet (3) as described in FIG. 8b. When the force is removed magnet (4) returns to its first position due to repulsive force that is applied by the S side of magnets (5) on the S side of magnet (4), and as a result of attractive force that is applied by the S side of magnets (5) and the N side of magnet (4). In addition, magnet (3) rotates back to its first position due to the repulsive force between the S side of magnets (5) and the S side of magnet (3)

The rotations of magnet (3) generate electricity in coil (22) that is harvested using an appropriated power management circuit. For simplicity, coil (22) is represented in FIG. 8 by a small rectangular. Magnet-coil configurations for converting movement into electricity are well known, and it is clear that any such magnet-coil configuration may be used.

Figure 9A:
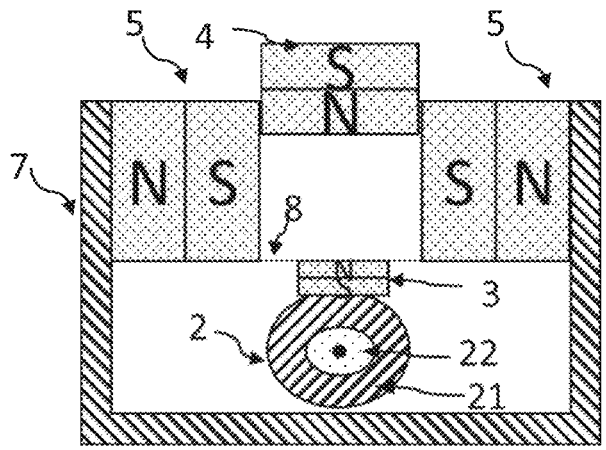
FIGS. 9(a)-9(c) depict a fourth embodiment of the invention.
Figure 9B:
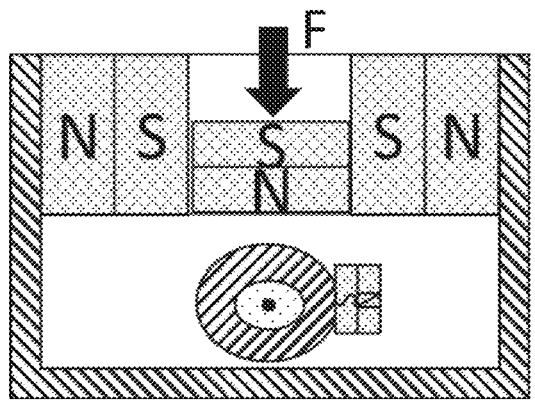
Figure 9C:
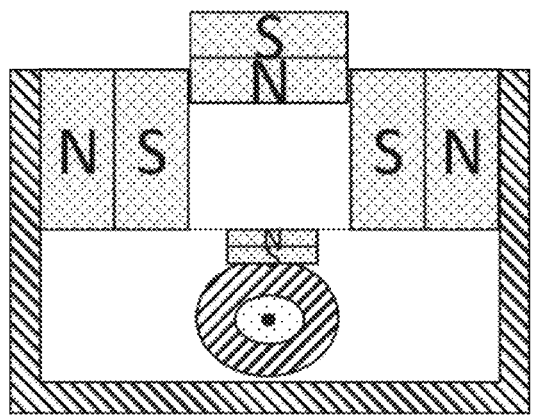

Reference is made to FIG. 9 that describes another embodiment of this invention. This embodiment comprises a moving magnets, (4), and pushback magnets (5) such that magnets (5) are fixed to the device body (7), and magnet (4) is designed to be positioned in its first position at the upper side of the magnets (5) and is designed to move in the vertical direction when a vertical force is applied. Magnet (3) is preferably a cylindrical magnet that is supported by a hinge (31) that is fixed to the body (7) and is free to rotate around it. In FIG. 9a Magnet (4) is at is first position.

When force F is applied on magnet (4), it is displaced downwards until it reached a stop (8) and rotates rotor (21) of dynamo (2) due to repulsive force that is generated on magnet (3) that is fixed to the rotor as described in FIG. 9b. When the force is removed magnet (4) returns to its first position due to repulsive force that is applied by the S side of magnets (5) on the S side of magnet (4), and as a result of attractive force that is applied by the S side of magnets (5) and the N side of magnet (4). In addition, rotor (2) rotates back to its first position due to the attractive force between the S side of magnets (5) and the N side of magnet (3).

The rotations of rotor (2) generate electricity in the dynamo (2) that is harvested using an appropriated power management circuit. The dynamo may be comprised of different magnet-coil configurations for converting movement into electricity and is a well-known art. It is clear that any such magnet-coil configuration may be used.

In general, we can say that the present invention discloses the harvesting system (1) that includes the dynamo (2) that comprises the rotor (21) and the stator (22) that is designed to be connected to the body (7). The harvesting system (1) also includes the push magnet (3) that is attached to the rotor (21) or that is a part of the rotor, and the moving magnet (4) that is capable to move from the first position to the second position, and the push back magnet (5). As explained above, the repulsive magnetic force that is exerted by the moving magnet (4) on the push magnet (3) in the second position is greater than the repulsive magnetic force that is exerted by the moving magnet (4) on the push magnet (3) in the first position, and when the moving magnet (4) moves from the first position to the second position it causes the rotor (21) to rotate from a dynamo first position to a dynamo second position, and the rotation of the rotor (21) from the dynamo first position to the dynamo second position causes the dynamo to produce current. When the moving magnet (4) moves back to the first position then the dynamo returns to the dynamo first position due to repulsive force that the push back magnet (5) exerts on the push magnet (3).

In another embodiment, the push magnet (3) comprises an upper pole (31) and a lower pole (32), and when the moving magnet (4) is in the first position it is closer to the upper pole than to the bottom pole and exerts an attractive magnetic force on the upper pole, and when the moving magnet (4) is in the second position it is closer to the lower pole than to the upper pole and exerts a repulsive magnetic force on the lower pole that causes the dynamo to rotate from the dynamo first position to the dynamo second position.

In another embodiment, the said push back magnet (5) comprises a right magnet (51) and a left magnet (52), and the moving magnet (4) is positioned between the right magnet and the left magnet, and is designed to be away from the push magnet while in the first position and to be closer to the push magnet while in the second position.

In another embodiment, the push back magnet (5) comprises the right magnet (51) and the left magnet (52), and the moving magnet (4) is positioned between the right magnet and the left magnet, and is designed to be away from the push magnet while in the first position and to be closer to the push magnet while in the second position, and the rotor (21) comprises an inner magnet (211) that constitute the push magnet (3), and the stator (22) comprises a coil (221) that is attached to said body (7).

What is claimed is:

1. An Energy harvesting device for converting a vertical force of a vertical motion to electricity, comprising:
    a free to rotate push magnet that is fixed by a hinge to a body of the energy harvesting device,
    a moving magnet that is designed to be vertically pushed from a first position to a second position when the vertical force is applied on the moving magnet,
    a push back magnet that is fixed to the body of the harvesting device, and
    a coil;
    wherein when the vertical force is applied on the moving magnet the moving magnet moves from said first position to said second position and when the moving magnet moves from said first positon to said second position a repulsive magnetic force of the moving magnet rotates the push magnet, wherein rotation of the push magnet causes current in the coil;
    wherein the push back magnet is designed to displace the moving magnet from said second position to said first position when the vertical force is stopped to be applied on the moving magnet; and wherein the push back magnet is designed to rotates backward the push magnet while the moving magnet is displaced to said first position.

2. The energy harvesting device according to claim 1, wherein said push back magnet comprises a right magnet and a left magnet, and wherein said moving magnet is positioned between the right magnet and the left magnet, and is designed to be away from the push magnet while in said first position and to be closer to the push magnet while in said second position.

* * * * *